(12) United States Patent
Sudo et al.

(10) Patent No.: US 12,529,375 B2
(45) Date of Patent: Jan. 20, 2026

(54) COMPRESSOR

(71) Applicant: Hitachi Industrial Equipment Systems Co., Ltd., Tokyo (JP)

(72) Inventors: Kosuke Sudo, Tokyo (JP); Nobuyuki Narisawa, Tokyo (JP); Sho Goto, Tokyo (JP); Naoya Hasegawa, Tokyo (JP)

(73) Assignee: HITACHI INDUSTRIAL EQUIPMENT SYSTEMS CO. LTD., Tokyo (JP)

( * ) Notice: Subject to any disclaimer, the term of this patent is extended or adjusted under 35 U.S.C. 154(b) by 0 days.

(21) Appl. No.: 18/840,259

(22) PCT Filed: Nov. 15, 2022

(86) PCT No.: PCT/JP2022/042312
§ 371 (c)(1),
(2) Date: Aug. 21, 2024

(87) PCT Pub. No.: WO2023/176040
PCT Pub. Date: Sep. 21, 2023

(65) Prior Publication Data
US 2025/0188921 A1    Jun. 12, 2025

(30) Foreign Application Priority Data
Mar. 15, 2022    (JP) ................. 2022-039776

(51) Int. Cl.
*F04B 53/02*    (2006.01)
*F04B 39/00*    (2006.01)
(Continued)

(52) U.S. Cl.
CPC .............. *F04B 53/02* (2013.01); *F04B 39/00* (2013.01); *F16J 9/24* (2013.01); *F04B 39/0005* (2013.01); *F16J 9/28* (2013.01)

(58) Field of Classification Search
CPC ......... F04B 39/0005; F04B 53/02; F16J 9/24; F16J 9/28
See application file for complete search history.

(56) References Cited

U.S. PATENT DOCUMENTS

| | | | | |
|---|---|---|---|---|
| 2,937,061 A | * | 5/1960 | Folkerts ..................... | F16J 9/06 277/498 |
| 3,658,350 A | * | 4/1972 | Ondraka ..................... | F16J 9/14 277/467 |

(Continued)

FOREIGN PATENT DOCUMENTS

| | | |
|---|---|---|
| JP | 55-69172 U | 5/1980 |
| JP | 58-146059 A | 10/1983 |

(Continued)

*Primary Examiner* — Dustin T Nguyen
(74) *Attorney, Agent, or Firm* — Volpe Koenig

(57) ABSTRACT

A compressor has a piston that has a piston ring groove in an outer circumferential surface formed of a curved surface and reciprocates while rocking in a cylinder, a piston ring that is mounted in the piston ring groove and slides on an inner circumferential surface of the cylinder, and a crankshaft that reciprocates the piston through a connecting rod. A center axis of the cylinder is disposed at a position separate from a rotation axis of the crankshaft. A rotation stopper for the piston ring is disposed in the piston ring groove. Joint gaps of the piston ring are located on a side of the outer circumferential surface of the piston pressed against the inner circumferential surface of the cylinder in a compression process.

8 Claims, 14 Drawing Sheets

(51) Int. Cl.
*F16J 9/24* (2006.01)
*F16J 9/28* (2006.01)

(56) References Cited

U.S. PATENT DOCUMENTS

| | | | | |
|---|---|---|---|---|
| 3,716,310 | A | * 2/1973 | Guenther | ............ F04B 39/0016 91/422 |
| 4,676,143 | A | 6/1987 | Nomura et al. | |
| 4,765,292 | A | * 8/1988 | Morgado | ................... F16J 1/10 123/193.6 |
| 4,848,213 | A | * 7/1989 | Wood | ........................ F16J 1/10 417/489 |
| 5,117,742 | A | 6/1992 | Iida | |
| 8,430,650 | B2 | * 4/2013 | Ohata | ................. F04B 39/0016 92/240 |
| 2009/0136373 | A1 | * 5/2009 | Adler | .................... F04B 39/121 418/63 |
| 2022/0074399 | A1 | 3/2022 | Narisawa et al. | |
| 2022/0106950 | A1 | 4/2022 | Narisawa et al. | |

FOREIGN PATENT DOCUMENTS

| | | | |
|---|---|---|---|
| JP | 61-48978 U | 4/1986 | |
| JP | 04-214970 A | 8/1992 | |
| JP | 2001271744 | * 10/2001 | .............. F04B 35/01 |
| JP | 2007-032532 A | 2/2007 | |
| JP | 2007032532 | * 2/2007 | .............. F04B 39/00 |
| JP | 2021-055647 A | 4/2021 | |
| WO | 2013/178310 A1 | 12/2013 | |
| WO | 2016/108275 A1 | 7/2016 | |
| WO | 2021/065037 A1 | 4/2021 | |

* cited by examiner

COMPRESSOR

TECHNICAL FIELD

The present invention relates to a compressor.

BACKGROUND ART

In recent years, efficiency enhancement has been required also in compressors due to acceleration of dealing with carbon neutrality. In particular, in a reciprocating compressor using a rocking piston, reducing the blow-by gas, which is a gas that leaks out from a compression chamber to the crank chamber side, is a task for the efficiency enhancement. In patent document 1, the blow-by gas is reduced by employing a curved surface as the outer circumferential surface of a rocking piston.

PRIOR ART DOCUMENT

Patent Document

Patent Document 1: JP-2021-055647-A

SUMMARY OF THE INVENTION

Problem to be Solved by the Invention

However, there is a possibility that the blow-by gas leaks out from a joint gap of a piston ring mounted in a piston ring groove of a piston, and there is room for improvement in the piston. An object of the present invention is to provide a compressor that can reduce a blow-by gas that leaks out from a joint gap of a piston ring.

Means for Solving the Problem

In order to achieve the above-described object, the present invention has a piston that has a piston ring groove in an outer circumferential surface formed of a curved surface and reciprocates while rocking in a cylinder, a piston ring that is mounted in the piston ring groove and slides on an inner circumferential surface of the cylinder, the piston ring having stepped joint part having a step in a circumferential direction, and a crankshaft that reciprocates the piston through a connecting rod. A center axis of the cylinder is disposed at a position separate from a rotation axis of the crankshaft. A rotation stopper for the piston ring is disposed in the piston ring groove. The joint part of the piston ring is located on a load side of the piston.

Advantages of the Invention

According to the present invention, a blow-by gas that leaks out from the joint gap of the piston ring can be reduced. Problems, configurations, and effects other than those described above will be made apparent from description of the following embodiments.

MODES FOR CARRYING OUT THE INVENTION

The configurations and operation of compressors according to first to third embodiments of the present invention will be described below with use of the drawings. Note that the same numeral indicates the same part in the respective drawings.

First Embodiment

Figure 1:
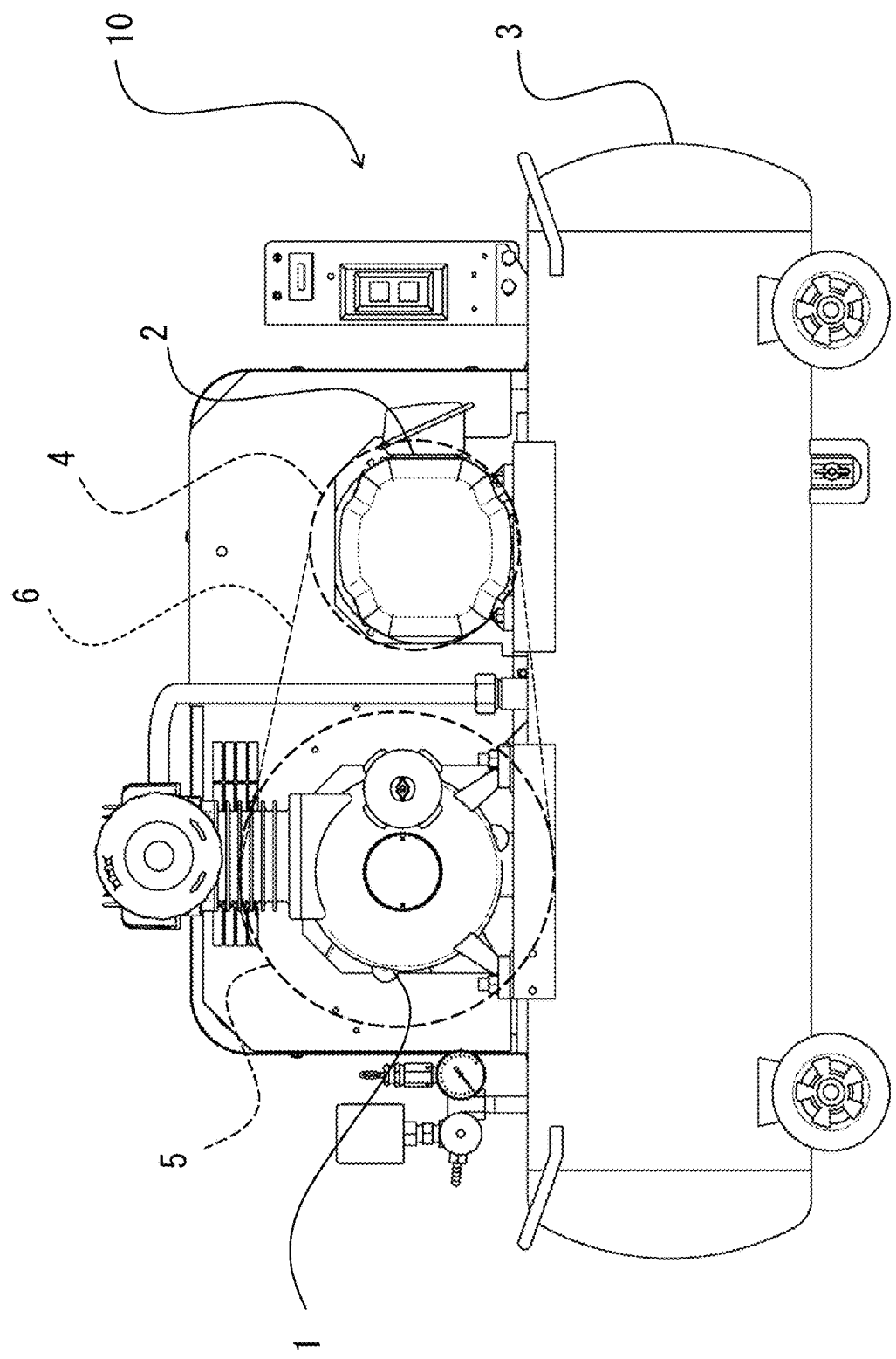
FIG. 1 is a front view of the compressor according to a first embodiment of the present invention.

FIG. 1 is a front view of the compressor according to the first embodiment of the present invention. A compressor 10 according to the first embodiment of the present invention is a machine that compresses a gas. As illustrated in FIG. 1, the compressor 10 includes a compressor main unit 1, an electric motor 2, a tank 3, an electric motor pulley 4, a compressor pulley 5, and a transmission belt 6.

The compressor main unit 1 is an apparatus that compresses a gas sucked from the external and discharges the sucked gas to the tank 3. Details thereof will be described later. The electric motor 2 is a power source that rotates an output shaft by being supplied with a current and drives the compressor main unit 1 through the electric motor pulley 4, the compressor pulley 5, and the transmission belt 6.

The tank 3 is a container that stores the compressed gas discharged from the compressor main unit 1. The tank 3 has high sealing performance so as to be capable of internally storing the compressed gas without leakage thereof, and has a strong structure that can withstand even high pressure attributed to the compressed gas. The compressor main unit 1 and the electric motor 2 are fixed onto the tank 3.

The electric motor pulley 4 is a pulley attached to the output shaft of the electric motor 2. The compressor pulley 5 is a pulley attached to a crankshaft 11 to be described later in the compressor main unit 1 and has a larger diameter than the electric motor pulley 4. Vanes for air cooling of the compressor main unit 1 are disposed on the compressor pulley 5.

The transmission belt 6 is a belt that is wound around the electric motor pulley 4 and the compressor pulley 5, and transmits the rotational force of the shaft of the electric motor 2 to the crankshaft of the compressor main unit 1. The output shaft of the electric motor 2 and the crankshaft 11 of the compressor main unit 1 are disposed substantially in parallel to each other. The rotational force of the electric motor 2 is transmitted to the compressor main unit 1 by the electric motor pulley 4, the compressor pulley 5, and the transmission belt 6.

Figure 2:
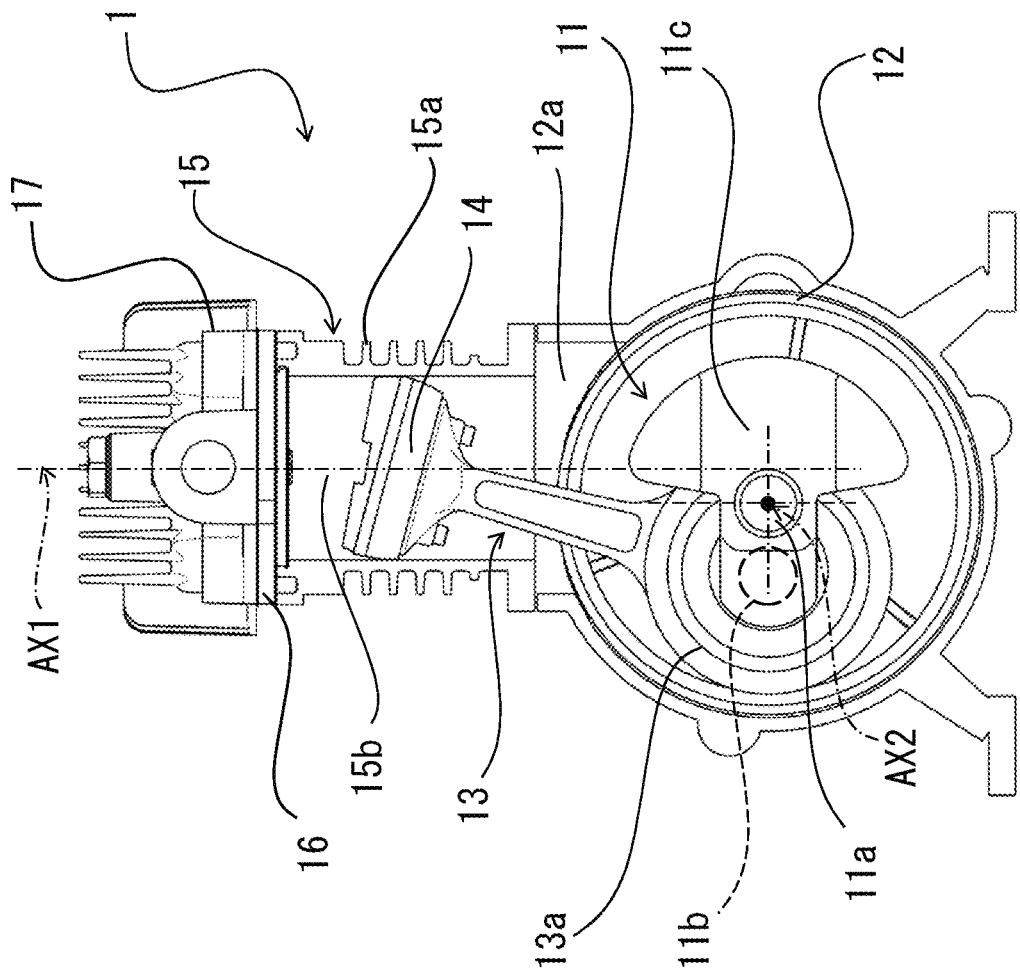
FIG. 2 is a sectional view illustrating the configuration of a compressor main unit according to the first embodiment of the present invention.

FIG. 2 is a sectional view illustrating the configuration of the compressor main unit 1 according to the first embodiment of the present invention. The compressor main unit 1 includes the crankshaft 11, a crankcase 12, a connecting rod 13, a piston 14, a cylinder 15, a valve plate 16, and a cylinder head 17.

The crankshaft 11 is a shaft for transforming the rotational force of the electric motor 2 transmitted from the compressor pulley 5 through the connecting rod 13 to reciprocating motion of the piston 14. The crankshaft 11 includes a main shaft 11a, a crankpin 11b, and a pair of counterweights 11c.

The main shaft 11a is a rotating shaft that is disposed at both ends of the crankshaft 11 and is supported by the crankcase 12 with the interposition of a bearing. The compressor pulley 5 is attached to the main shaft 11a and the main shaft 11a rotates together with the compressor pulley 5.

The crankpin 11b is a pin disposed in parallel to the main shaft 11a between the pair of counterweights 11c. A large end portion 13a of the connecting rod 13 to be described later is attached to the crankpin 11b.

The pair of counterweights 11c are weights having the center of gravity on the opposite side to the crankpin 11b. The movement of the center of gravity caused by reciprocating motion of the piston 14 to be described later is caused to fall within the allowable range by the counterweights 11c, and vibrations of the compressor main unit 1 are suppressed.

The crankcase 12 is a component that covers the crankshaft 11. A crank chamber 12a is formed in the crankcase 12. In the crankcase 12, a support hole for supporting the main shaft 11a with the interposition of the bearing and a through-hole for allowing the connecting rod 13 to protrude into the cylinder 15 are made.

The connecting rod 13 is a component that couples the crankshaft 11 with the piston 14 to be described later. The large end portion 13a that is one end portion of the connecting rod 13 is attached to the crankpin 11b as described above. Furthermore, the piston 14 is fixed to the other end portion of the connecting rod 13. By the connecting rod 13, rotational motion of the crankshaft 11 is transformed to oscillatory motion and the oscillatory motion is transmitted to the piston 14.

The piston 14 is a component that makes reciprocating motion in the cylinder 15, and sucks a gas to compresses the sucked gas. Details thereof will be described later.

The cylinder 15 is a cylinder that houses the piston 14 and is made of a metal. The cylinder 15 is assembled to the crankcase 12 in such a manner as to communicate with the crank chamber 12a. The connecting rod 13 is inserted into the cylinder 15. Moreover, a plurality of fins 15a for cooling are disposed on an outer circumferential wall of an end portion of the cylinder 15.

Furthermore, a center axis AX1 of the cylinder 15 is disposed at a position separate from a rotation axis AX2 of the crankshaft 11 in order to set the oscillation angle of the connecting rod 13 in the compression process small.

The valve plate 16 is a plate that closes the other opening of the cylinder 15. A gap in the cylinder 15 between the valve plate 16 and the piston 14 forms a compression chamber 15b. In the valve plate 16, an intake hole and an intake valve for taking in a gas and a discharge hole and a discharge valve for discharging a gas are disposed. Moreover, the cylinder head 17 is disposed on the valve plate 16.

In the above, the compressor 10 according to the first embodiment of the present invention is a single-cylinder compressor including a pair of the piston 14 and the cylinder 15. However, the present invention is not limited to this embodiment. The compressor 10 according to the first embodiment of the present invention can be made into a multi-cylinder compressor having multiple pairs of the pistons 14 and the cylinders 15 in series or in a radial manner with respect to the crankshaft 11.

Furthermore, in the above, the compressor 10 according to the first embodiment of the present invention transmits the rotational force of the electric motor 2 to the compressor main unit 1 through the electric motor pulley 4, the compressor pulley 5, and the transmission belt 6. However, the present invention is not limited to this embodiment. In the compressor 10 according to the first embodiment of the present invention, the crankshaft 11 of the compressor main unit 1 and the shaft of the electric motor 2 may be disposed on the same straight line, and be joined by using a linking apparatus such as a coupling, and the rotational force of the electric motor 2 may be transmitted to the compressor main unit 1.

Figure 3:
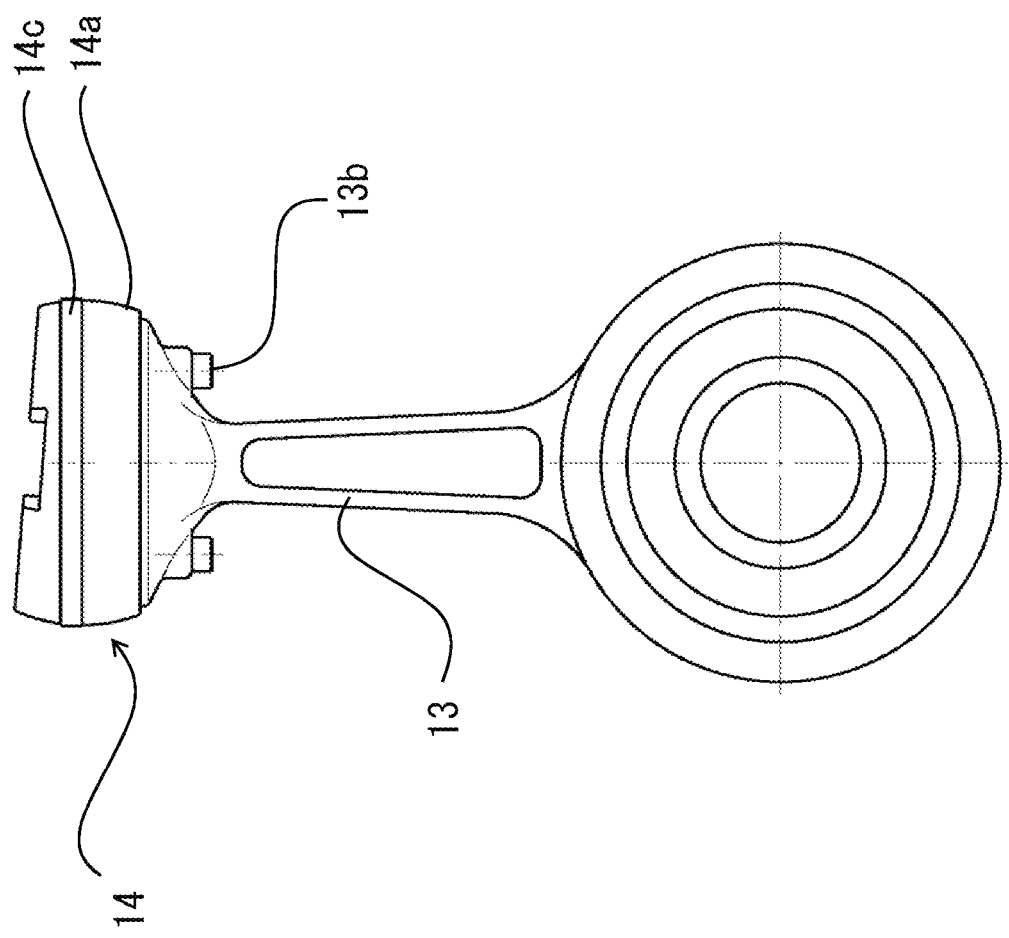
FIG. 3 is a front view of a piston according to the first embodiment of the present invention.
Figure 4:
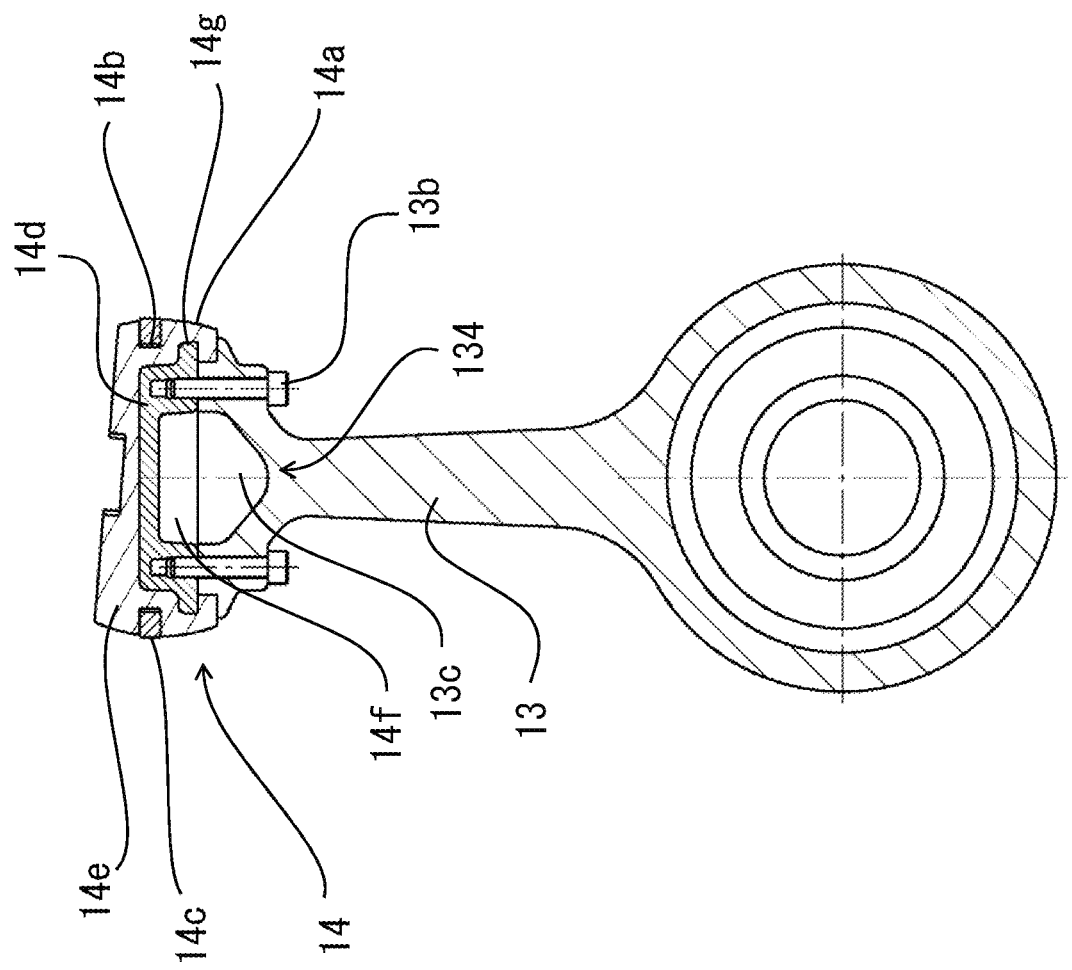
FIG. 4 is a sectional view of the piston according to the first embodiment of the present invention.

FIG. 3 is a front view of the piston 14 according to the first embodiment of the present invention. FIG. 4 is a sectional view of the piston 14 according to the first embodiment of the present invention.

The piston 14 is a rocking piston and is fixed to an end portion of the connecting rod 13 by screws 13b, and reciprocates while rocking in the cylinder 15 through rotation of the crankshaft 11.

An outer circumferential surface 14a of the piston 14 is formed of a curved surface in order to set the clearance between the piston 14 that rocks and the inner circumferential surface of the cylinder 15 to a predetermined internal. Note that it is preferable for the outer circumferential surface 14a of the piston 14 to be formed of a spherical surface with an outer diameter slightly smaller than the inner diameter of the cylinder 15.

Moreover, a piston ring groove 14b is made in the outer circumferential surface of the piston 14, and a piston ring 14c is mounted therein. Note that it is preferable for the outer circumferential surface 14a of the piston 14 to be formed of a resin in order to suppress the blow-by gas.

As illustrated in FIG. 4, the piston 14 includes a piston insert 14d having screw holes and a piston head 14e that covers the piston insert 14d.

The piston insert 14d is a circular plate-shaped member formed from a metal such as an aluminum alloy, and is fixed to an upper end portion of the connecting rod 13 by the screws 13b. A hollow part 14f that opens toward the connecting rod 13 side is made at the center of the lower surface of the piston insert 14d.

The hollow part 14f communicates with a hollow part 13c made at the center of the upper end of the connecting rod 13 to form a hollow space 134. Due to the hollow space 134, the weight of the connecting rod 13 and the piston 14 can be reduced and vibrations can be suppressed. In addition, accumulation of heat of compression in the inside the piston insert 14d and the connecting rod 13 can be suppressed.

Furthermore, a flange portion 14g is disposed on the side surface of the piston insert 14d.

The piston head 14e is a resin that covers the upper surface of the piston insert 14d and the flange portion 14g, and is shaped by mold processing for example. Because the piston head 14e covers the flange portion 14g on the side surface of the piston insert 14d, separation of the piston head 14e from the piston insert 14d due to reciprocation of the piston 14 can be suppressed.

The piston head 14e is formed of a resin having wear resistance, for example, PTFE (polytetrafluoroethylene), PPS (polyphenylene sulfide), a phenol resin, a polyimide-based resin, a COPNA resin, or a resin obtained by mixing them.

The piston ring groove 14b that is an annular groove for mounting the piston ring 14c as described above is made in the outer circumferential surface of the piston head 14e. In the piston ring groove 14b, a rotation stopper that suppresses rotation of the piston ring 14c in the piston ring groove 14b in the circumferential direction is disposed.

Figure 5:
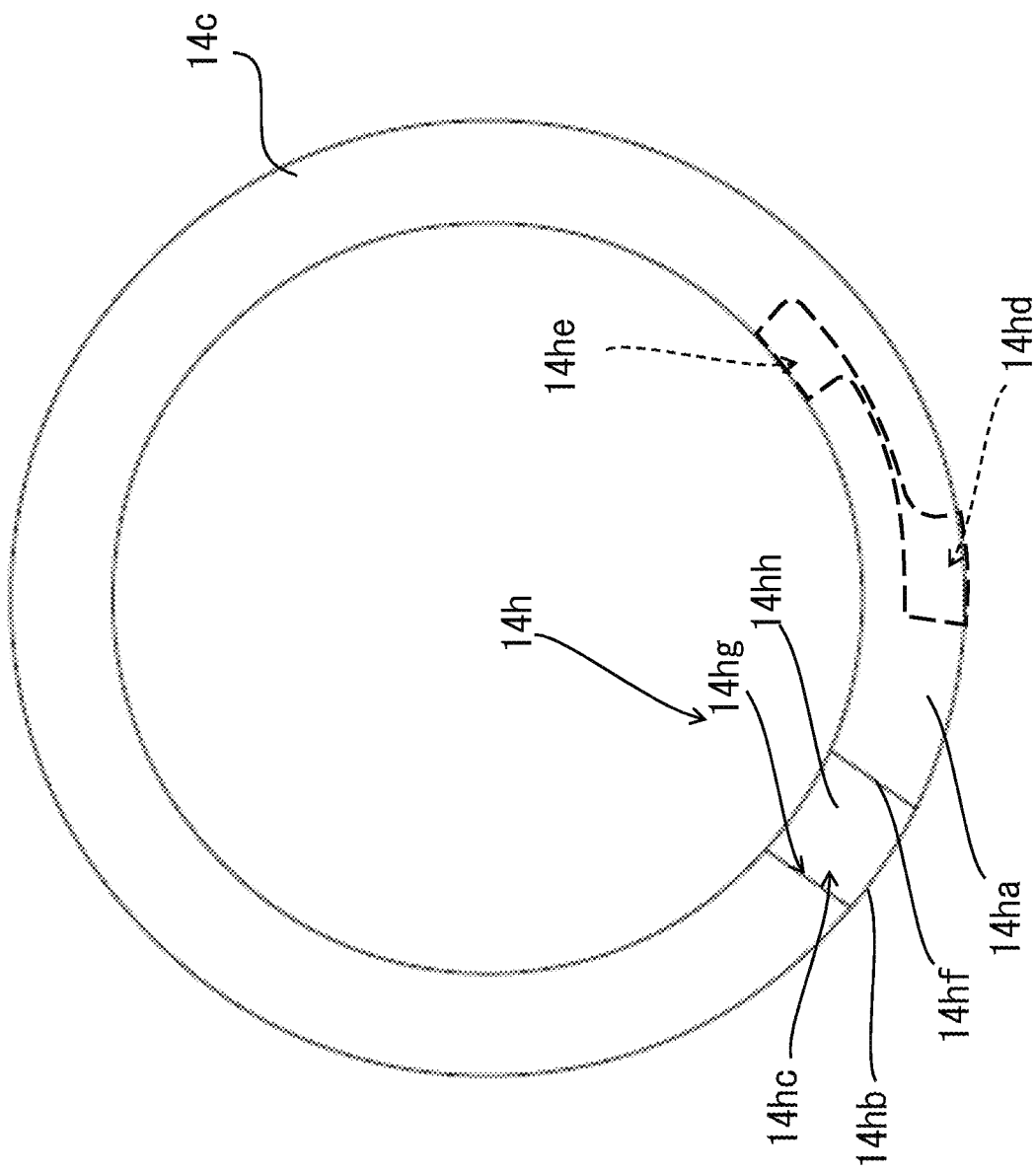
FIG. 5 is a plan view of a piston ring according to the first embodiment of the present invention.
Figure 6:
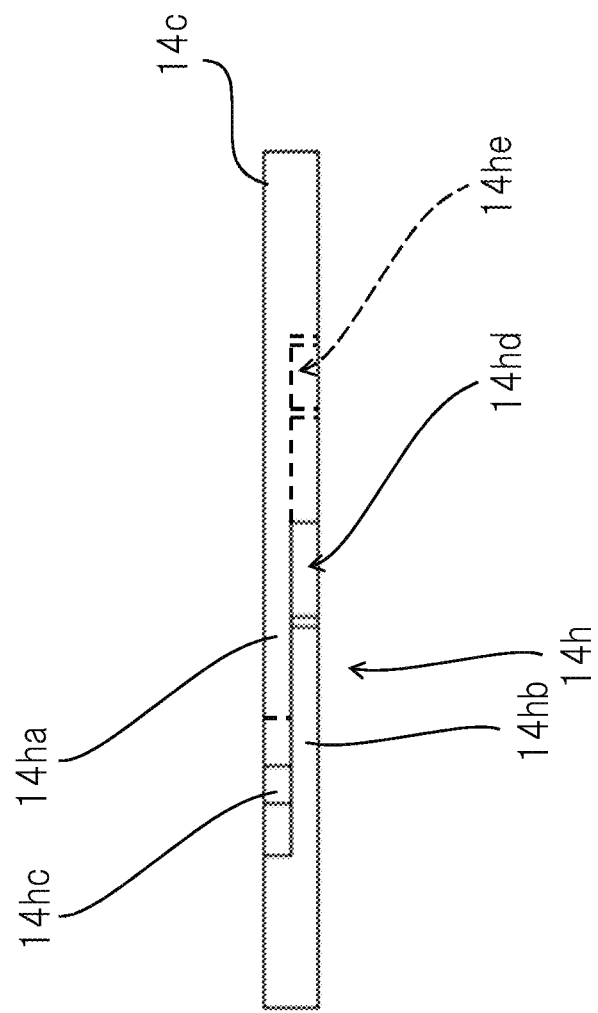
FIG. 6 is a front view of the piston ring according to the first embodiment of the present invention.
Figure 7:
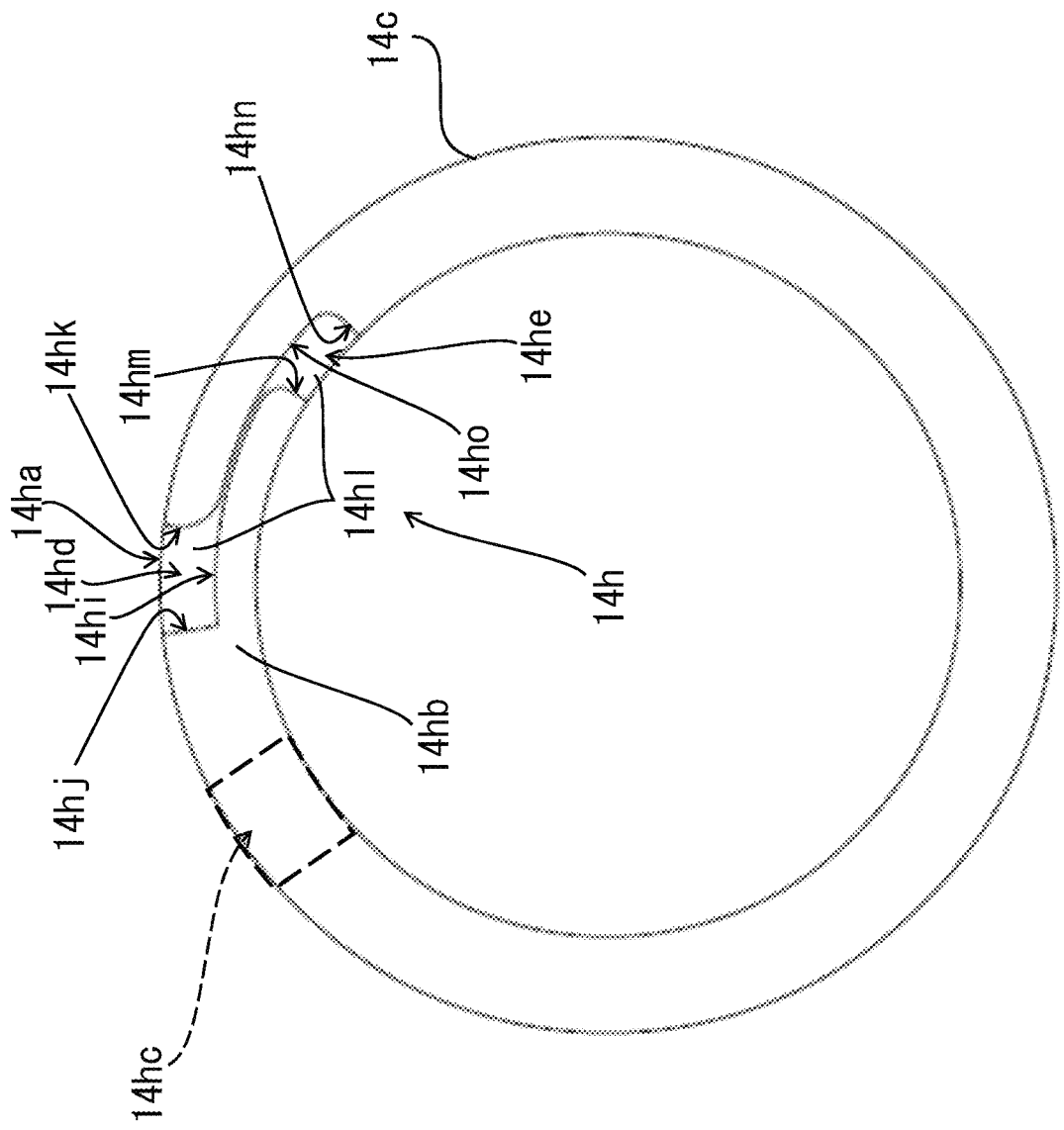
FIG. 7 is a bottom view of the piston ring according to the first embodiment of the present invention.

FIG. 5 is a plan view of the piston ring 14c according to the first embodiment of the present invention. FIG. 6 is a front view of the piston ring 14c according to the first embodiment of the present invention. FIG. 7 is a bottom view of the piston ring 14c according to the first embodiment of the present invention.

The piston ring 14c is an annular sliding material that is mounted in the piston ring groove 14b and gets contact with the inner circumferential surface of the cylinder 15, and is formed of a resin material excellent in the wear resistance, for example, PTFE (polytetrafluoroethylene: tetrafluoroethylene resin). The piston ring 14c slides on the inner circumferential surface of the cylinder 15 in association with reciprocation of the piston 14. The gap between the outer circumference of the piston 14 and the inner circumferential surface of the cylinder 15 is sealed by the piston ring 14c. Thus, the leakage of the compressed gas from the compression chamber 15b to the crank chamber 12a can be suppressed.

As illustrated in FIGS. 5 to 7, a joint part 14h that is a cut in the piston ring 14c is made in the piston ring 14c. The joint part 14h allows the piston ring 14c to be mounted in the piston ring groove 14b of the piston 14 and expand and contract while keeping the sealing performance.

The joint part 14h of the present embodiment is a joint of commonly called a stepped joint and has a leakage cutting shape including two plate-shaped portions (first plate-shaped portion 14ha and second plate-shaped portion 14hb) that are separated to the side of the compression chamber 15b and the side of the crank chamber 12a in the axial direction and can slide while overlapping with each other. Moreover, in the joint part 14h, a first joint gap 14hc is formed on the side of the compression chamber 15b, and a second joint gap 14hd and a third joint gap 14he are formed on the side of the crank chamber 12a.

As illustrated in FIG. 5, the first joint gap 14hc is surrounded by a first end surface 14hf of the first plate-shaped portion 14ha in the circumferential direction, a second end surface 14hg opposed to the first end surface 14hf, and a first side surface 14hh that is a side surface of the second plate-shaped portion 14hb on the side of the compression chamber 15b, and opens toward the compression chamber 15b side and in the radial direction.

As illustrated in FIG. 7, the second joint gap 14hd is surrounded by a third end surface 14hi that is an end surface of the second plate-shaped portion 14hb in the outer diameter direction, a fourth end surface 14hj that is an outer-diameter-side end surface of the second plate-shaped portion 14hb in the circumferential direction, a fifth end surface 14hk opposed to the fourth end surface 14hj, and a second side surface 14hl that is a side surface of the first plate-shaped portion 14ha on the side of the crank chamber 12a, and opens toward the crank chamber 12a side and in the outer diameter direction.

As illustrated in FIG. 7, the third joint gap 14he is surrounded by a sixth end surface 14hm that is an inner-diameter-side end surface of the second plate-shaped portion 14hb in the circumferential direction, a seventh end surface 14hn opposed to the sixth end surface 14hm, an eighth end surface 14ho opposed to the third end surface 14hi, and the second side surface 14hl that is the side surface of the first plate-shaped portion 14ha on the side of the crank chamber 12a, and opens toward the crank chamber 12a side and in the inner diameter direction.

The second joint gap 14hd and the third joint gap 14he are formed at positions different in the circumferential direction. Thus, due to pressing of the inner circumferential surface and the outer circumferential surface of the piston ring 14c by the compressed gas, the third end surface 14hi and the eighth end surface 14ho are pressed against each other, and a blow-by gas generated between the second joint gap 14hd and the third joint gap 14he can be suppressed.

Figure 8:
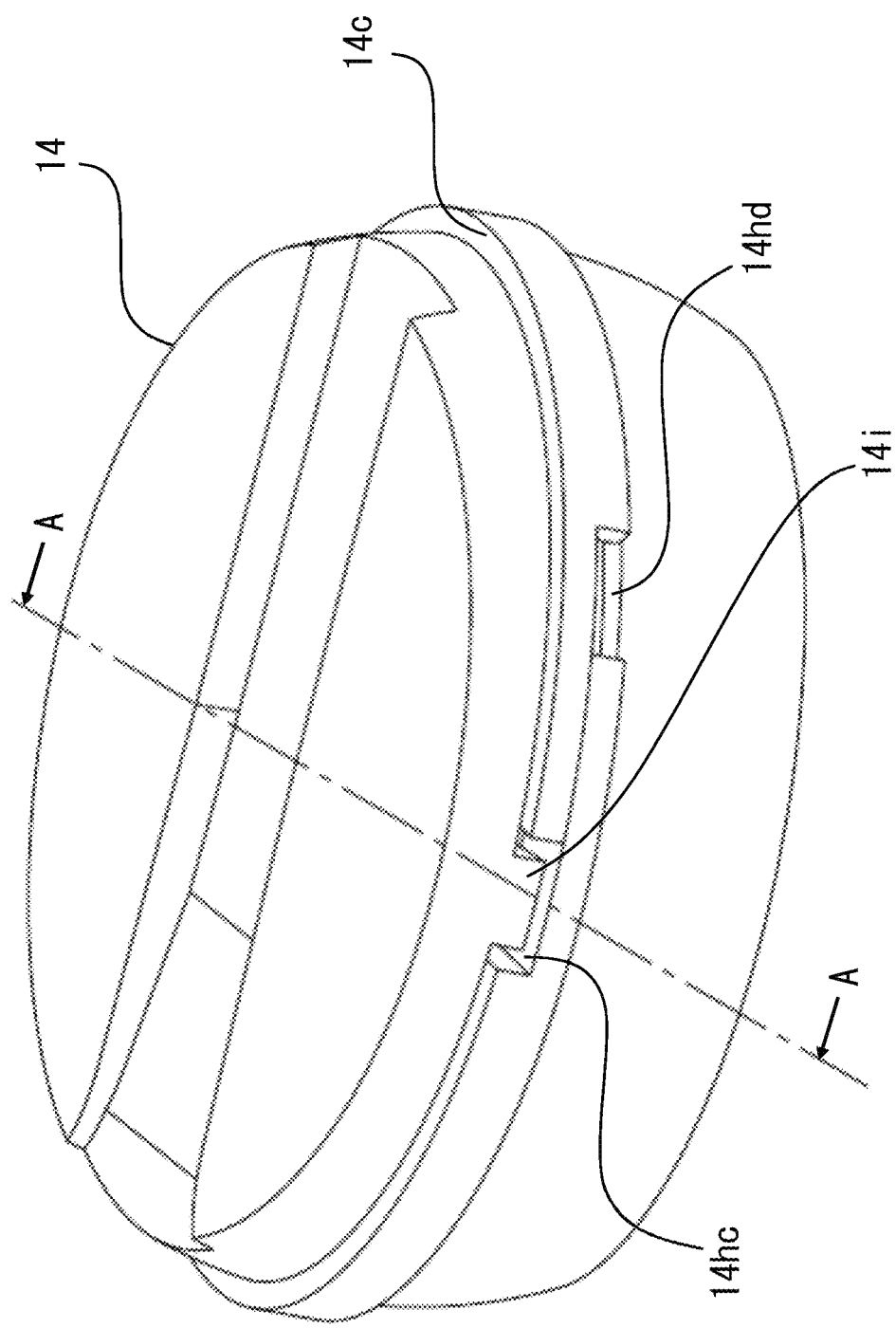
FIG. 8 is a perspective view of the piston according to the first embodiment of the present invention.

FIG. 8 is a perspective view of the piston 14 according to the first embodiment of the present invention. As illustrated in FIG. 8, a rotation stopper 14i is disposed in the joint gap (first joint gap 14hc) of the piston ring 14c. Specifically, the rotation stopper 14i of the present embodiment protrudes from the sidewall of the piston ring groove 14b on the side of the compression chamber 15b and is disposed in the first joint gap 14hc that has a recessed shape formed in the joint part 14h, which is the stepped joint of the piston ring 14c.

Note that the embodiment has been illustrated in the above in which the rotation stopper 14i is disposed in the first joint gap 14hc. However, the present invention is not limited to this embodiment. For example, the rotation stopper may be disposed not only in the first joint gap 14hc but also in the second joint gap 14hd. This can further reduce the blow-by gas that leaks out from the joint gaps, and improve the sealing performance.

Figure 9:
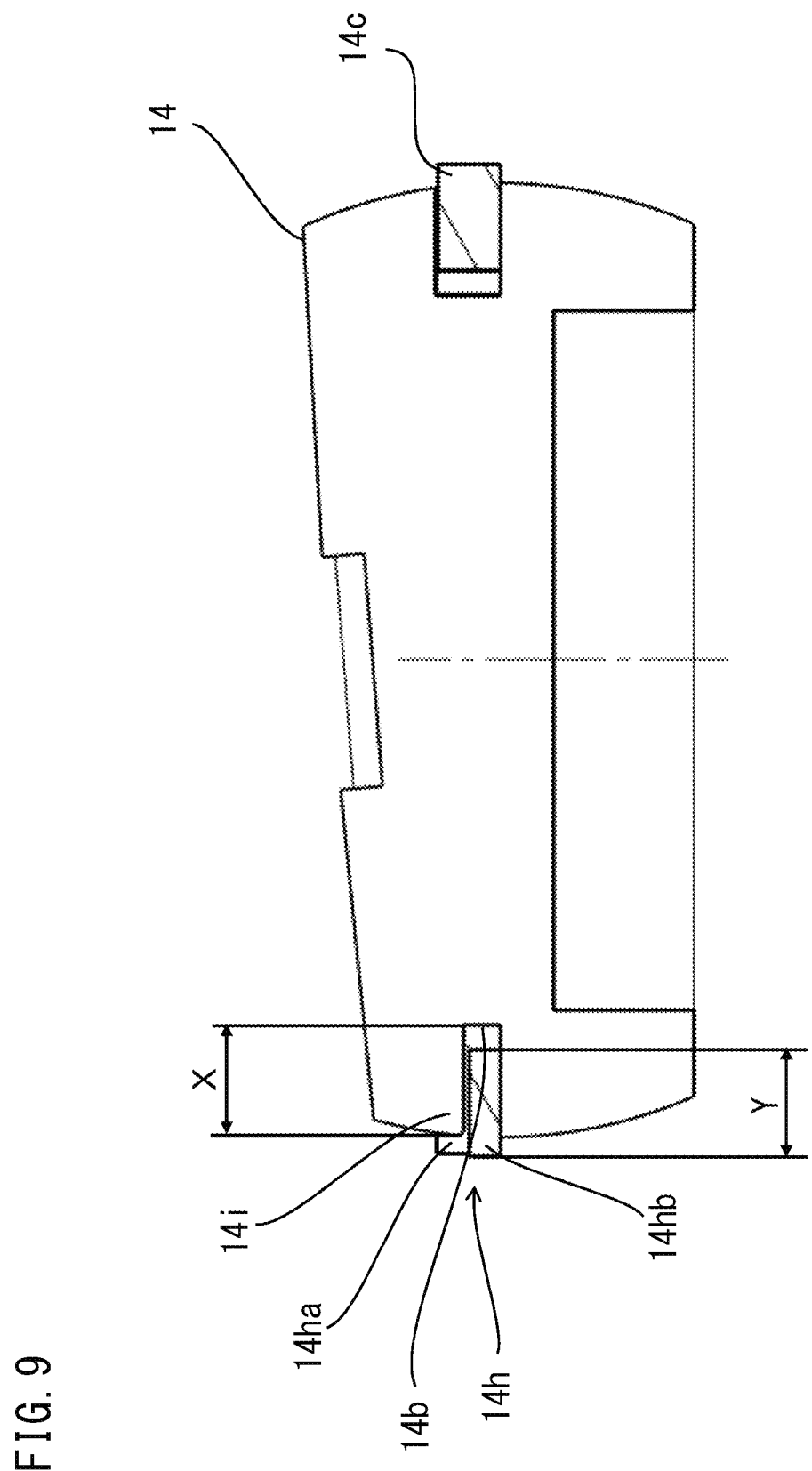
FIG. 9 is a schematic diagram of a section along line A-A in FIG. 8.

FIG. 9 is a schematic diagram of a section along line A-A in FIG. 8. Note that the piston insert 14d and the piston head 14e are schematically illustrated as a monolithic member in FIG. 9.

As illustrated in FIG. 9, the thickness of the piston ring 14c is smaller than the width of the piston ring groove 14b. Thus, the piston ring 14c can be mounted in the piston ring groove 14b.

The outer diameter of the piston ring 14c is larger than the outer diameter of the piston 14. Furthermore, the inner diameter of the piston ring 14c is larger than the outer diameter of the piston ring groove 14b, and a gap is formed between the inner circumferential surface of the piston ring 14c and the bottom surface of the piston ring groove 14b. Moreover, the joint gaps are made in the piston ring 14c in such a manner as to be capable of expanding and contracting.

Thus, the diameter of the piston ring 14c mounted on the piston 14 can be reduced by narrowing the gap between the inner circumferential surface of the piston ring 14c and the bottom surface of the piston ring groove 14b and the joint gaps. Therefore, the piston ring 14c can be inserted into the cylinder 15. Furthermore, the compressed gas presses the inner circumferential wall of the piston ring 14c, and thereby the outer diameter of the piston ring 14c inserted into the cylinder 15 increases. Thus, the piston ring 14c is pressed against the inner circumferential surface of the cylinder 15 and can exert the sealing performance.

Moreover, it is preferable that the width Y of the piston ring 14c in the radial direction be smaller than the depth X of the piston ring groove 14b. In this case, in the compression process, the piston ring 14c on the load side is pressed by the inner circumferential surface of the cylinder 15 and is housed in the piston ring groove 14b, and the outer circumferential surface of the piston 14 slides on the inner circumferential surface of the cylinder 15.

Figure 10:
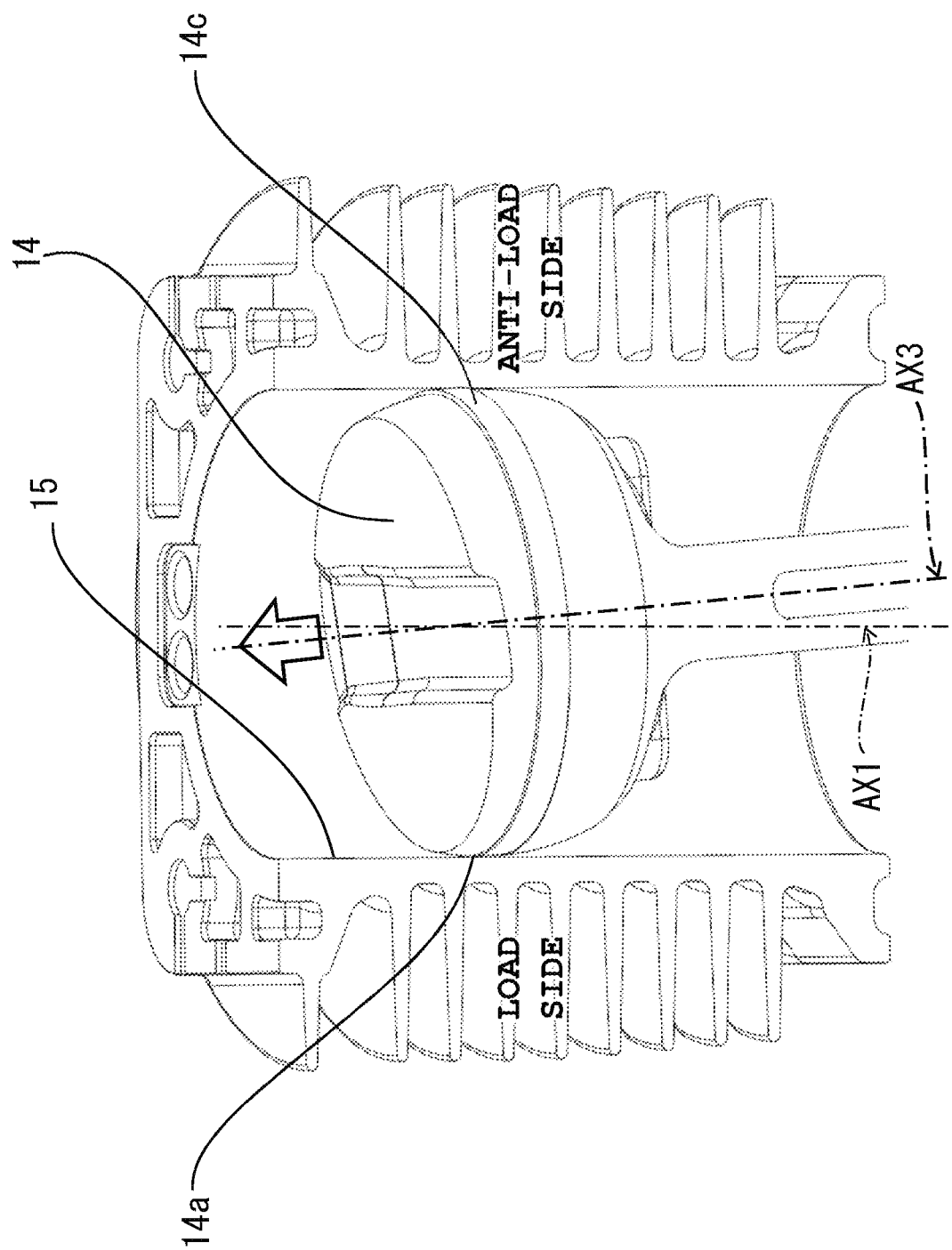
FIG. 10 is a partially sectional perspective view illustrating the piston and a cylinder in a compression process by the compressor main unit according to the first embodiment of the present invention.

FIG. 10 is a partially sectional perspective view illustrating the piston 14 and the cylinder 15 in the compression process by the compressor main unit 1 according to the first embodiment of the present invention.

The piston 14 is a rocking piston that reciprocates while rocking in the cylinder 15. Thus, as illustrated in FIG. 10, in the compression process, a center axis AX3 of the piston 14 inclines with respect to the center axis AX1 of the cylinder 15, and the piston 14 rises with an inclination along the center axis AX3 as illustrated by an arrow. Due to this, in the compression process, the piston 14 is pressed against the inner circumferential surface of the cylinder 15 on the side toward which the piston 14 rises with the inclination along the center axis AX3.

The first joint gap 14hc to the third joint gap 14he are disposed on the side of the outer circumferential surface of the piston 14 pressed against the inner circumferential surface of the cylinder 15 in the compression process, due to the rotation stopper 14i disposed in the piston ring groove 14b. That is, in the present embodiment, the rotation stopper 14i disposed in the first joint gap 14hc is disposed in the piston ring groove 14b on the side of the outer circumferential surface of the piston 14 pressed against the inner circumferential surface of the cylinder 15 in the compression process.

Next, effects by the compressor 10 according to the present embodiment will be described in detail.

[Effects]

In a compressor according to a comparative example that does not have the rotation stopper for the piston ring in the piston, the piston ring gradually rotates through repeated reciprocation of the piston. Thus, there is a possibility that the joint gap is located on the opposite side (anti-load side) to the side toward which the piston 14 rises with the inclination along the center axis AX3 in the compression process (load side).

In the piston ring 14c on the anti-load side, the inner circumferential wall of the piston ring 14c is pressed by the compressed gas. Therefore, when the joint gap is located on the anti-load side, the joint gap enlarges and the blow-by gas that leaks out from the joint gap increases.

In the present embodiment, the piston ring 14c is fixed by the rotation stopper 14i in such a manner that the joint gaps (first joint gap 14hc to third joint gap 14he) of the piston ring 14c are located on the side of the outer circumferential surface 14a of the piston 14 pressed against the inner circumferential surface of the cylinder 15 in the compression process. That is, the positions of the joint gaps are fixed on the load side.

When the joint gaps are fixed on the load side, in the compression process, the piston ring 14c is pressed against the inner circumferential surface of the cylinder 15 on the load side, and the diameter of the piston ring 14c on the load side is reduced. Thus, the joint gaps are narrowed. Furthermore, because the joint gap is not present on the anti-load side, the blow-by gas that leaks out from the anti-load side is suppressed. Therefore, the compressor 10 according to the present embodiment can narrow the joint gaps of the piston ring 14c, and thus reduce the blow-by gas that leaks out from the joint gaps.

Moreover, in the compressor 10 according to the present embodiment, it is preferable that the width Y of the piston ring 14c be smaller than the depth X of the piston ring groove 14b. When the width Y of the piston ring 14c is larger than the depth X of the piston ring groove 14b, the piston ring 14c protrudes from the piston ring groove 14b and abuts against the inner circumferential surface of the cylinder 15 to slide thereon. In this case, because the joint gaps is present on the load side as described above, the joint gaps are narrowed and the blow-by gas can be suppressed.

In contrast, when the width Y of the piston ring 14c is smaller than the depth X of the piston ring groove 14b, the piston ring 14c including the joint gaps being present on the load side is pressed by the inner circumferential surface of the cylinder 15 and is housed in the piston ring groove 14b in the compression process. In this case, the outer circumferential surface 14a of the piston 14, which is formed by the piston head 14e formed of a resin, slides on the inner circumferential surface of the cylinder 15 in the compression process. This can reduce the blow-by gas that leaks out from the joint gaps of the piston ring 14c.

Furthermore, in the present embodiment, the rotation stopper 14i is disposed in the joint gap (first joint gap 14hc) of the piston ring 14c. Thus, the rotation of the piston ring 14c can be suppressed by using the first joint gap 14hc of the piston ring 14c, and the cost can be suppressed. In addition, the blow-by gas that leaks out from the joint gaps of the piston ring 14c can be reduced.

Moreover, in the present embodiment, the joint part 14h of the piston ring 14c is a stepped joint having a step in the circumferential direction of the piston ring. This can decrease the opening of the piston ring in the axial direction and suppress the blow-by gas.

Furthermore, the rotation stopper 14i protrudes from a side surface of the piston ring groove 14b toward the first joint gap 14hc of the stepped joint, and is fitted into the first joint gap 14hc. That is, the rotation stopper 14i is disposed in the first joint gap 14hc that has a recessed shape formed in the joint part 14h, which is the stepped joint of the piston ring 14c. Thus, the rotation of the piston ring 14c can be suppressed by using the first joint gap 14hc of the piston ring, and the cost can be suppressed. Moreover, the blow-by gas that leaks out from the first joint gap 14hc can be further reduced.

Furthermore, in the piston ring 14c according to the present embodiment, the first joint gap 14hc is formed on the side of the compression chamber 15b, and the second joint gap 14hd and the third joint gap 14he are formed on the side of the crank chamber 12a.

Because the piston 14 rises with an inclination, the outer circumferential surface of the piston 14 pressed against the inner circumferential surface of the cylinder 15 in the compression process is on the side of the compression chamber 15b. The rotation stopper 14i according to the present embodiment is disposed in the first joint gap 14hc on the side of the compression chamber 15b. Thus, the blow-by gas can be reduced compared with a case of a piston in which the rotation stopper is disposed in the second joint gap 14hd and the third joint gap 14he on the side of the crank chamber 12a.

Note that the purpose of the rotation stopper 14*i* is to limit the movement of the positions of the joint gaps in the circumferential direction of the piston ring groove 14*b*, and therefore the rotation stopper 14*i* may be disposed in the second joint gap 14*hd* and the third joint gap 14*he* on the side of the crank chamber 12*a*. Moreover, the rotation stopper may be disposed in the first joint gap 14*hc* and the second joint gap 14*hd* to increase the area of the piston 14 that slides on the inner circumferential surface of the cylinder 15, and improve the sealing performance.

Second Embodiment

Figure 11:
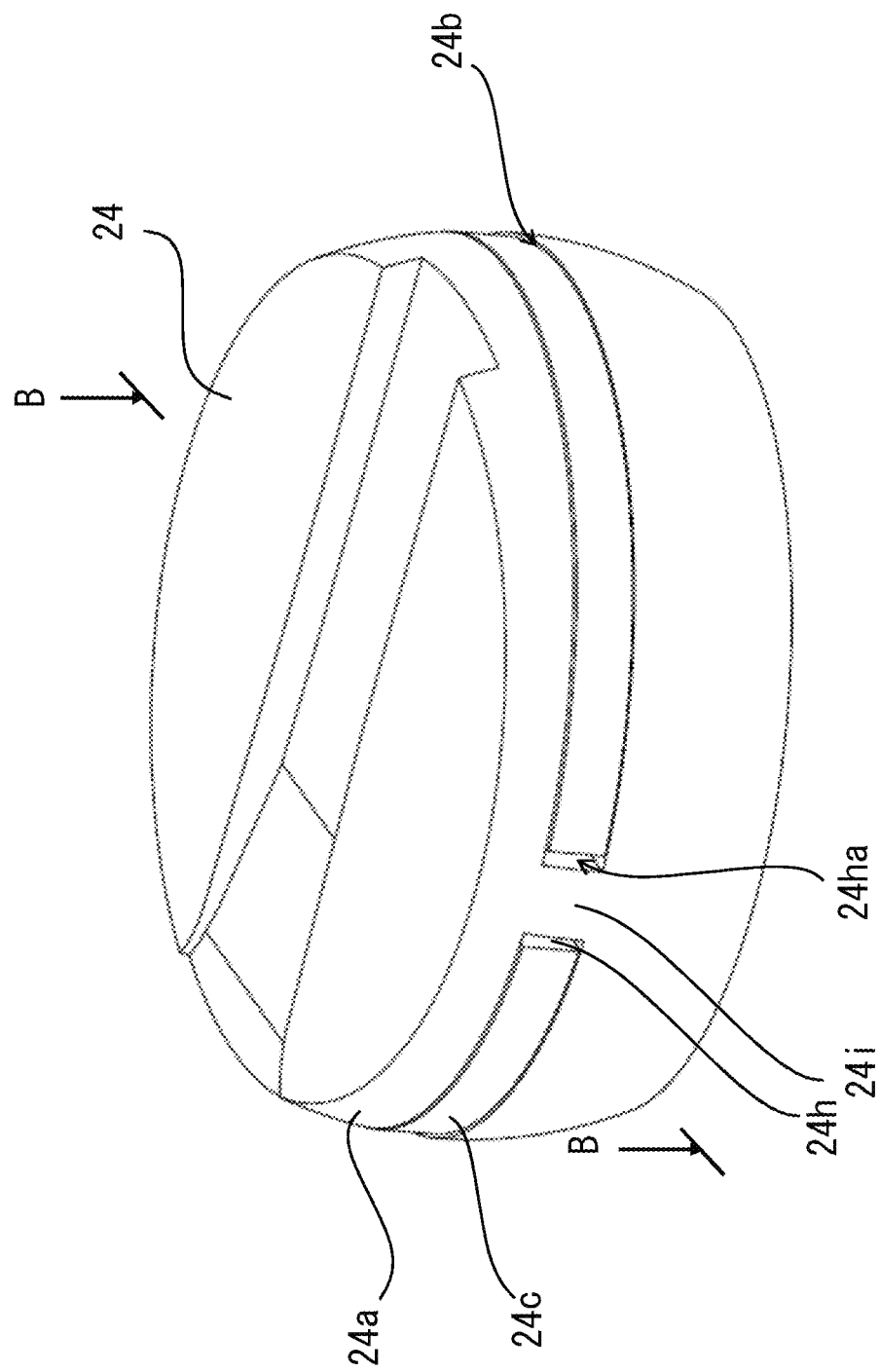
FIG. 11 is a perspective view of the piston according to the second embodiment of the present invention.
Figure 12:
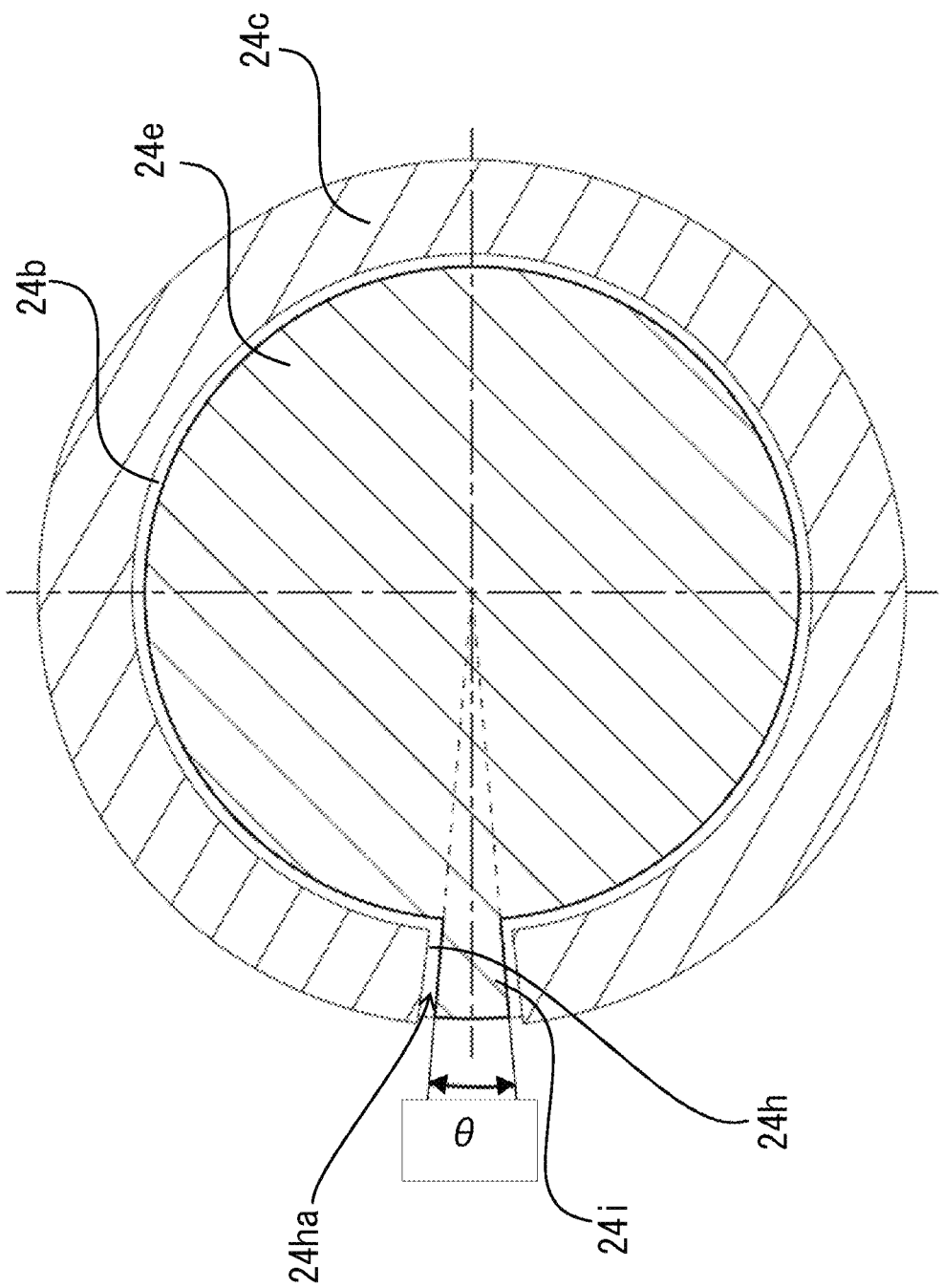
FIG. 12 is a schematic diagram of a section along line B-B in FIG. 11.

FIG. 11 is a perspective view of a piston according to a second embodiment of the present invention. Furthermore, FIG. 12 is a schematic diagram of a section along line B-B in FIG. 11. Note that the piston insert 14*d* and the piston head 14*e* are schematically illustrated as a monolithic member in FIG. 12.

Differences of a piston 24 according to the present embodiment from the piston 14 according to the first embodiment are the shape of a joint part 24*h* of a piston ring 24*c* and the shape of a rotation stopper 24*i*.

Specifically, the joint part 24*h* of the present embodiment is a joint of commonly called a right angle joint and has a straight cut shape arising from splitting of the piston ring 24*c* along the radial direction. A joint gap 24*ha* opens toward the compression chamber 15*b* side, toward the crank chamber 12*a* side, and in the radial direction.

Moreover, similarly first to the embodiment, it is preferable that the rotation stopper 24*i* be disposed in the joint gap 24*ha* of the piston ring 24*c*. Note that the joint gap 24*ha* of the piston ring 24*c* is located on the side of an outer circumferential surface 24*a* of the piston 24 pressed against the inner circumferential surface of the cylinder 15 in the compression process, similarly to the first embodiment.

That is, it is preferable that the outer circumferential surface 24*a* of the piston 24 be formed of a resin and the outer circumferential surface of the piston 24 on the load side slide on the inside surface of the cylinder in the compression process.

Specifically, it is preferable for the rotation stopper 24*i* to be a protruding portion that protrudes from the bottom surface of a piston ring groove 24*b* to the outside surface 24*a* of the piston 24, and divides the piston ring groove 24*b* in the circumferential direction. The rotation stopper 24*i* is located in the joint gap 24*ha* of the piston ring 24*c* mounted in the piston ring groove 24*b*.

In other words, in the piston 24 of the present embodiment, the piston ring groove 24*b* is formed along the other outer circumference while the outer circumference corresponding to only θ° being left on the load side of the piston 24, and the part of the outer circumference corresponding to θ° is used as the rotation stopper 24*i*.

[Effects]

In the present embodiment, the joint part 24*h* of the piston ring 24*c* is the joint of commonly called the right angle joint and has the straight cut shape arising from splitting of the piston ring 24*c* along the radial direction. Thus, processing of the piston ring 24*c* is easy, so that the cost can be suppressed.

Furthermore, the rotation stopper 24*i* is the protruding portion that is disposed in the joint gap of the piston ring 24*c* mounted in the piston ring groove 24*b* and protrudes from the bottom surface of the piston ring groove to the outside surface of the piston to divide the piston ring groove in the circumferential direction. Thus, the joint gap 24*ha* of the piston ring 24*c* is provided with the rotation stopper 24*i*, which is the protruding portion of the piston 24, and the rotation stopper 24*i* as the protruding portion slides on the inside surface of the cylinder 15. This can suppress the amount of blow-by gas that leaks from the joint gap 24*ha* of the piston ring 24*c*.

When the outside surface of the piston ring 24*c* gets contact with the inside surface of the cylinder 15, the contact part is switched from a line to a surface and from a surface to a line. Thus, non-continuous contact is made to provide room for improvement in the sealing performance. In the piston 24 of the present embodiment, the outer circumferential surface of the piston 24 on which the protruding portion 24*i* is disposed continuously gets contact with the inside surface of the cylinder 15. This can improve the sealing performance.

Moreover, the joint gap 24*ha* of the right angle joint originally formed into the straight cut shape is wider than the joint gap of the stepped joint, and therefore involves a larger amount of blow-by gas that leaks out than the joint gap of the stepped joint. However, in the piston 24 of the present embodiment, the joint gap 24*ha* is located on the load side and the joint gap 24*ha* is narrowed. In addition, the rotation stopper 24*i* is disposed in the joint gap 24*ha* and slides on the inner circumferential surface of the cylinder 15. Thus, the blow-by gas that leaks out from the joint gap 24*ha* can be reduced. Note that it is preferable that the width of the joint gap 24*ha* be small because the piston ring 24*c* pressed against the inner circumferential surface of the cylinder 15 becomes small and it becomes impossible to narrow the joint gap 24*ha* when the width of the joint gap 24*ha* is set large.

Third Embodiment

Figure 13:
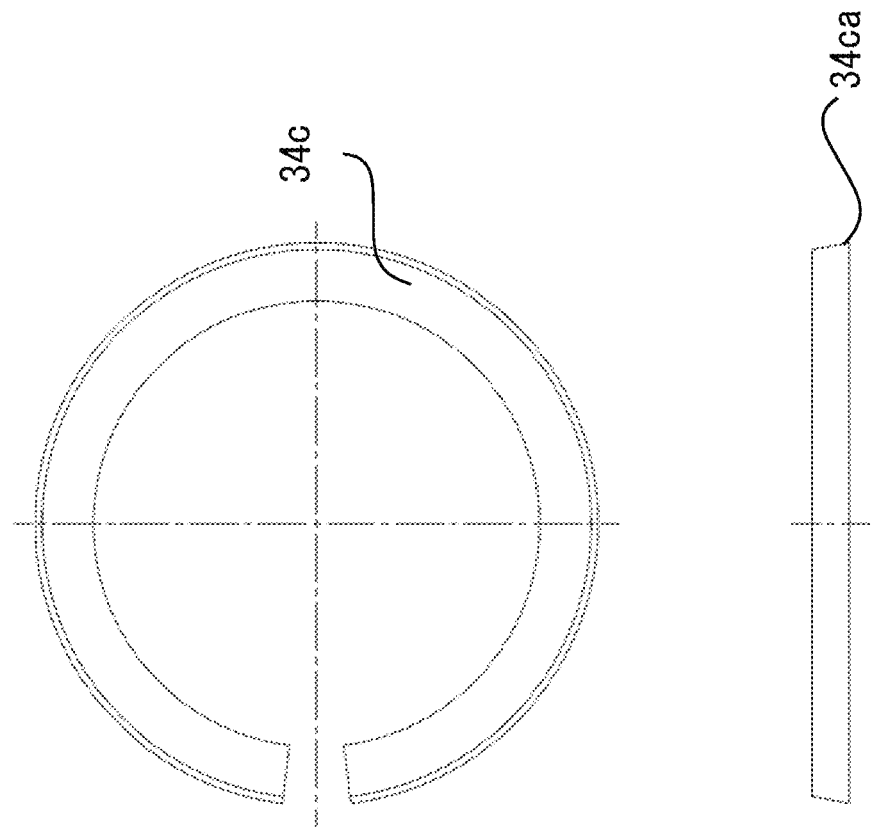
FIG. 13 includes a plan view and a front view of a piston ring according to a third embodiment of the present invention.

FIG. 13 includes a plan view and a front view of a piston ring 34*c* according to a third embodiment of the present invention. A difference of the piston ring 34*c* according to the present embodiment from the piston ring 24*c* according to the second embodiment is that a ridge portion 34*ca* that gets line-contact with the inside surface of the cylinder 15 and slides on the inside surface of the cylinder 15 is disposed across the whole circumference of the piston ring 34*c*.

Specifically, in the piston ring 34*c* of the present embodiment, the outer circumferential surface of the piston ring 34*c* inclines with respect to the inner circumferential surface of the cylinder 15, and the ridge portion 34*ca* is formed by the rim of the outer circumferential surface of the piston ring 34*c*.

In other words, the outer diameter on the side of the crank chamber 12*a* is larger than that on the side of the compression chamber 15*b*, and the outer circumferential end portion on the side of the crank chamber 12*a* forms the ridge portion 34*ca* that gets line-contact with the inside surface of the cylinder 15 and slides on the inside surface of the cylinder 15.

Note that the ridge portion is not limited to the above-described shape. For example, a curved surface that protrudes toward the inside surface of the cylinder 15 may be disposed at the outer circumference of the piston ring 34*c* and be employed as the ridge portion.

[Effects]

With a piston ring that does not include the ridge portion 34*ca*, at the time of switching from the compression process to the intake process, the part that gets contact with the inner circumferential surface of the cylinder in the piston ring is switched in order H the outer edge on the side of the compression chamber 15*b*, the side surface, and the outer edge on the side of the crank chamber 12a. Thus, there is a possibility of the occurrence of a blow-by gas. Furthermore, when the piston ring gets surface-contact with the inner circumferential surface of the cylinder 15, the pressure is lower than that in the case of line-contact, and therefore there is a possibility of the lowering of the sealing performance.

In the present embodiment, the ridge portion 34ca that gets line-contact with the inside surface of the cylinder 15 and slides on the inside surface of the cylinder 15 is disposed across the whole circumference of the piston ring 34c. Thus, the sealing performance of the piston ring 34c can be improved, and the leakage of the blow-by gas from the compression chamber 15b to the crank chamber 12a can be suppressed.

Moreover, in the piston ring 34c of the present embodiment, the outer circumferential surface of the piston ring 34c inclines with respect to the inner circumferential surface of the cylinder 15, and the ridge portion is formed by the rim 34ca with the large diameter in the outer circumferential surface of the piston ring 34c. Thus, the processing cost of the piston ring 34c can be suppressed. In addition, the strength of the ridge portion can be improved, so that the durability of the piston ring can be improved.

Note that the present invention is not limited to the above-described embodiments and various modification examples are included therein. For example, the above-described embodiments are described in detail in order to explain the present invention in an easy-to-understand manner, and are not necessarily limited to that including all configurations described. Furthermore, it is possible to replace part of a configuration of a certain embodiment by a configuration of another embodiment. Moreover, it is also possible to add a configuration of a certain embodiment to a configuration of another embodiment. In addition, it is possible to execute addition, deletion, or substitution of another configuration regarding part of configurations of the respective embodiments.

Figure 14:
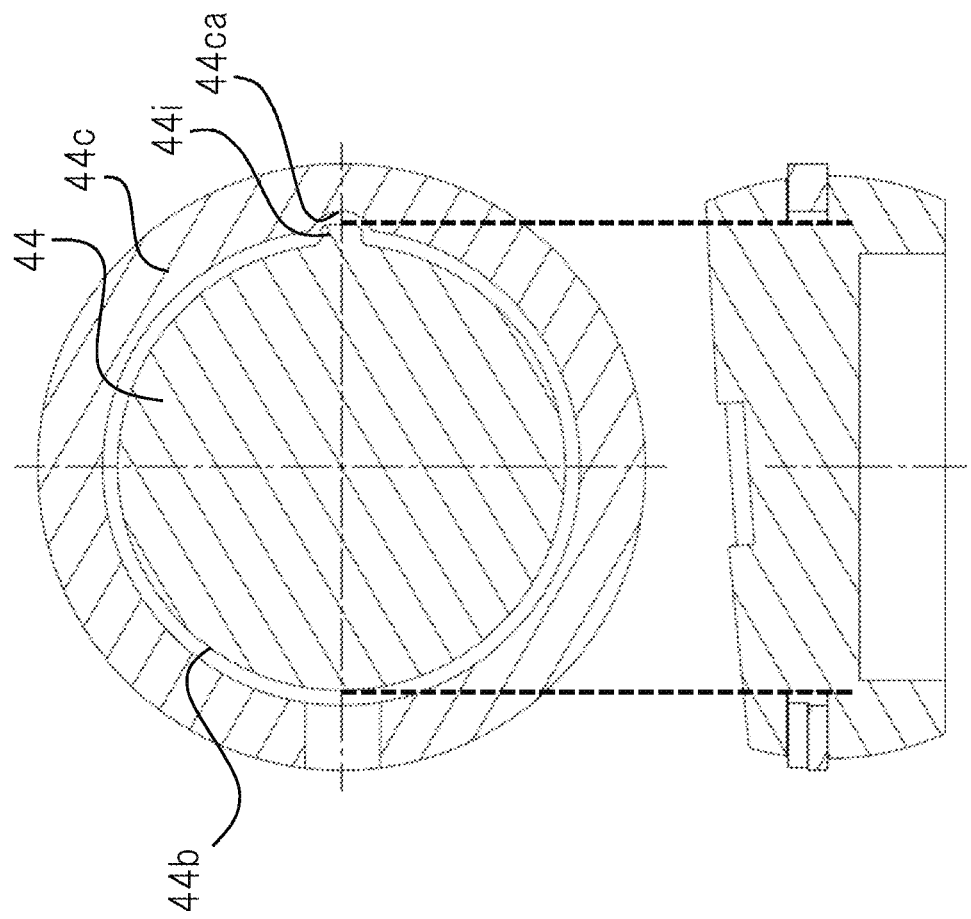
FIG. 14 includes a cross sectional view and a longitudinal sectional view of a piston according to another embodiment of the present invention.

Note that an embodiment of the present invention may be the following mode. For example, as illustrated in FIG. 14, a recessed portion 44ca may be made at a part different from a joint part in a piston ring 44c, and a rotation stopper 44i may be disposed so as to protrude from the bottom surface of a piston ring groove 44b into the recessed portion 44ca. Moreover, the thickness of the rotation stopper 44i may be set thinner than that of the piston ring 44c.

DESCRIPTION OF REFERENCE CHARACTERS

1: Compressor main unit
2: Electric motor
3: Tank
10: Compressor
11: Crankshaft
12: Crankcase
12a: Crank chamber
13: Connecting rod
14, 24, 34: Piston
14a, 24a: Outer circumferential surface
14b, 24b, 44b: Piston ring groove
14c, 24c, 34c, 44c: Piston ring
14e: Piston head
14h, 24h: Joint part
14ha: First plate-shaped portion
14hb: Second plate-shaped portion
14hc, 14hd, 14he, 24ha: Joint gap
15: Cylinder
15b: Compression chamber
24i: Protruding portion
34ca: Ridge portion (outer circumferential end portion)
44ca: Recessed portion

The invention claimed is:

1. A compressor comprising:
a piston that has a piston ring groove in an outer circumferential surface formed of a curved surface and reciprocates while rocking in a cylinder;
a piston ring that is mounted in the piston ring groove and slides on an inner circumferential surface of the cylinder, the piston ring having a stepped joint part having a step in a circumferential direction; and
a crankshaft that reciprocates the piston in the cylinder through a connecting rod, wherein
a center axis of the cylinder is disposed at a position separate from a rotation axis of the crankshaft,
a rotation stopper for the piston ring is disposed in the piston ring groove, and
the joint part of the piston ring is entirely located on a load side of the piston;
wherein the load side is a side of the piston that encounters a higher load relative to a non-load side of the piston due to being inclined and pressed against the inner circumferential surface of the cylinder in a direction along a center axis of the connecting rod during a compression process.

2. The compressor according to claim 1, wherein
the outer circumferential surface of the piston is formed of a resin, and
the outer circumferential surface of the piston slides on an inside surface of the cylinder in a compression process in which the piston compresses a gas in the cylinder.

3. The compressor according to claim 2, wherein
a width of the piston ring in a radial direction is smaller than a depth of the piston ring groove.

4. The compressor according to claim 1, wherein
a ridge portion of the piston ring that is in contact with an inside surface of the cylinder and slides on the inside surface of the cylinder is disposed across whole circumference of the piston ring.

5. The compressor according to claim 4, wherein
an outer circumferential surface of the piston ring inclines with respect to the inner circumferential surface of the cylinder and the ridge portion is formed by a rim of the outer circumferential surface of the piston ring.

6. The compressor according to claim 1, wherein
the rotation stopper is disposed in a joint gap of the piston ring.

7. The compressor according to claim 6, wherein
the joint gap of the piston ring is formed in the stepped joint having the step in the circumferential direction of the piston ring.

8. The compressor according to claim 1, wherein
in the joint part, a first joint gap is formed on a compression chamber side, and
the first joint gap is present at a position that is on the load side of the piston and intersects a plane that extends along a center axis of the piston and is orthogonal to the rotation axis of the crankshaft.

* * * * *